United States Patent
Zhang et al.

(10) Patent No.: US 9,019,809 B2
(45) Date of Patent: Apr. 28, 2015

(54) NOISE POWER ESTIMATION METHOD

(71) Applicant: Aeroflex Limited, Hertfordshire (GB)

(72) Inventors: Yuan Zhang, Hertfordshire (GB); Li-Ke Huang, Hertfordshire (GB)

(73) Assignee: Aeroflex Limited, Stevenage (GB)

( * ) Notice: Subject to any disclaimer, the term of this patent is extended or adjusted under 35 U.S.C. 154(b) by 124 days.

(21) Appl. No.: 13/898,207

(22) Filed: May 20, 2013

(65) Prior Publication Data

US 2013/0315049 A1    Nov. 28, 2013

(30) Foreign Application Priority Data

May 22, 2012  (GB) .................................. 1209022.1

(51) Int. Cl.
| | |
|---|---|
| H04J 11/00 | (2006.01) |
| H04L 5/00 | (2006.01) |
| H04L 25/02 | (2006.01) |
| H04L 27/26 | (2006.01) |
| H04L 1/20 | (2006.01) |

(52) U.S. Cl.
CPC ........... *H04J 11/0063* (2013.01); *H04L 5/0007* (2013.01); *H04L 25/0204* (2013.01); *H04L 25/0232* (2013.01); *H04L 27/2611* (2013.01); *H04L 27/2647* (2013.01); *H04L 1/20* (2013.01)

(58) Field of Classification Search
CPC ....................................................... H04J 11/00
USPC .......... 370/203, 328–339, 345; 375/224–227, 375/341–348
See application file for complete search history.

(56) References Cited

U.S. PATENT DOCUMENTS

| | | | |
|---|---|---|---|
| 2004/0128605 A1 | 7/2004 | Sibecas et al. | |
| 2006/0291577 A1* | 12/2006 | Boariu | 375/260 |
| 2008/0137718 A1 | 6/2008 | Cha et al. | |
| 2008/0219144 A1 | 9/2008 | Brehler et al. | |
| 2009/0141834 A1* | 6/2009 | Imamura et al. | 375/341 |
| 2011/0044409 A1* | 2/2011 | Yoshimoto et al. | 375/340 |

OTHER PUBLICATIONS

United Kingdom Intellectual Property Office, Search Report for GB 1209022.1 dated Sep. 20, 2012, 1 page.

* cited by examiner

*Primary Examiner* — Iqbal Zaidi
(74) *Attorney, Agent, or Firm* — Maschoff Brennan

(57) ABSTRACT

A method for estimating noise power in a received signal that was transmitted using an orthogonal frequency division multiple access (OFDMA) modulation scheme in which pilot symbols are transmitted during OFDM symbol periods of the transmitted signal, the method comprising: interleaving a de-patterned pilot symbol that was transmitted in an OFDM symbol period of the transmitted signal with a de-patterned pilot symbol that was transmitted in a previous OFDM symbol period of the transmitted signal to generate an interleaved de-patterned pilot symbol; filtering the de-patterned interleaved pilot symbol to remove a signal component of the interleaved pilot symbol to leave a noise component of the interleaved de-patterned pilot symbol; and processing the noise component generated by the filtering to generate an estimate of the noise power in the interleaved de-patterned pilot symbol.

3 Claims, 6 Drawing Sheets

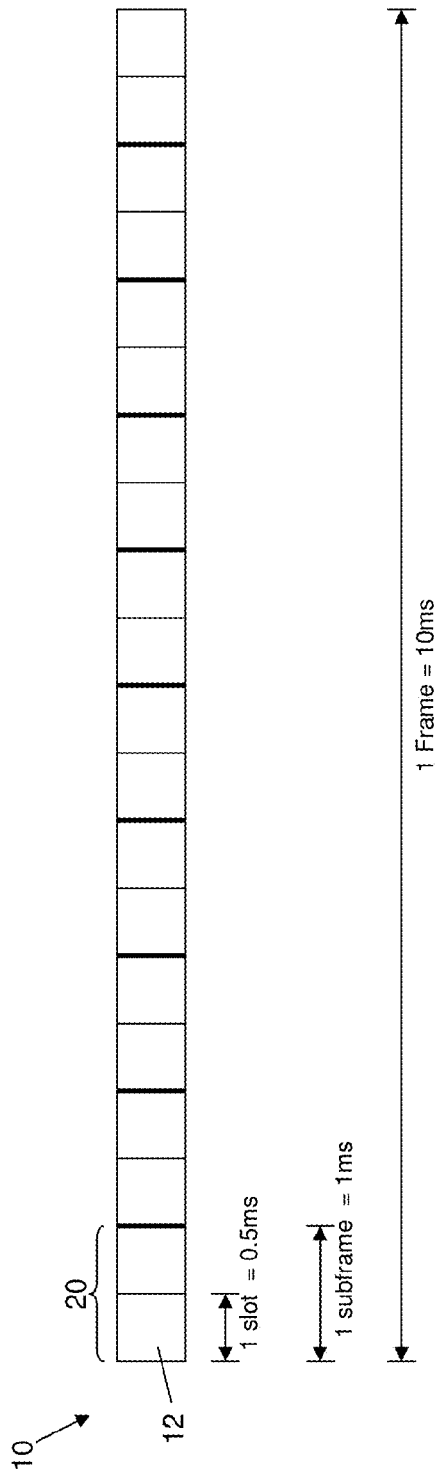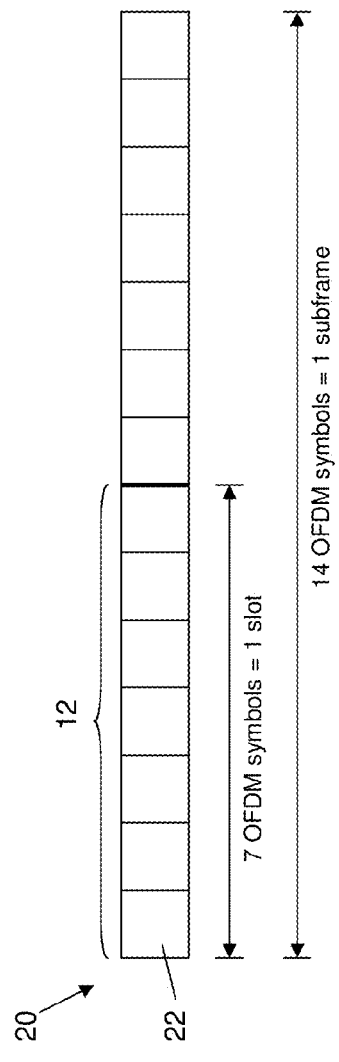
Figure 1
Figure 2

NOISE POWER ESTIMATION METHOD

CROSS-REFERENCES TO RELATED APPLICATIONS

The present application claims priority to Great Britain Patent Application No. 1209022.1, filed May 22, 2012 entitled "A Noise Power Estimation Method" the entire disclosure of which is hereby incorporated by reference, for all purposes, as if fully set forth herein.

TECHNICAL FIELD

The present invention relates to a noise power estimation method.

BACKGROUND

In order to support higher data rates in mobile telecommunications networks, the third generation partnership project (3GPP) introduced a new air interface based on orthogonal frequency domain multiple access (OFDMA) techniques as the long term evolution (LTE) of the UMTS network. LTE supports a peak downlink data rate of 300 Mbps and a peak uplink data rate of 75 Mbps.

Since 2009 3GPP has worked on the further improvement of LTE to meet the requirements of a more demanding standard known as LTE Advanced (LTE-A). LTE and LTE-A use adaptive modulation and coding to achieve optimum throughput in different channel conditions, by modifying, at the transmitter, the coding rate and modulation order according to the current quality of the propagation channel between the transmitter and a user equipment (UE) such as a mobile telephone receiving the transmitted signal. This adaptive modulation and coding requires accurate estimation of signal to noise power ratio (SNR) by the UE, which can have a significant effect on system throughput.

It is known to use a moving average filter to filter out noise from a signal received by a UE. Comparing the input and output of the moving average filter provides an estimate of the noise power in the received signal. Estimating the noise power in a received signal using a moving average filter in this way gives good results in additive white Gaussian noise (AWGN) propagation channels. However, in time varying channels, the accuracy of noise power estimation using this technique is limited.

A number of other noise estimation algorithms are known, but these are impractical for an LTE receiver, as either they cannot meet the performance requirements for multipath fading channels with large propagation delays or mobility, or they are not compliant with the 3GPP standard, or the algorithms are too complex for implementation in a practical receiver.

BRIEF SUMMARY

According to a first aspect of the present invention there is provided a method for estimating noise power in a received signal that was transmitted using an orthogonal frequency division multiple access (OFDMA) modulation scheme in which pilot symbols are transmitted during OFDM symbol periods of the transmitted signal, the method comprising: interleaving a de-patterned pilot symbol that was transmitted in an OFDM symbol period of the transmitted signal with a de-patterned pilot symbol that was transmitted in a previous OFDM symbol period of the transmitted signal to generate an interleaved de-patterned pilot symbol; filtering the interleaved de-patterned pilot symbol to remove a signal component of the interleaved de-patterned pilot symbol to leave a noise component of the interleaved de-patterned pilot symbol; and processing the noise component generated by the filtering to generate an estimate of the noise power in the interleaved de-patterned pilot symbol.

The method may further comprise performing a phase rotation of the de-patterned pilot symbols of the received signal in the frequency domain.

The de-patterned pilot symbol that was transmitted in the previous OFDM symbol period may be stored in a buffer.

The method may further comprise scaling the noise power estimate to compensate for errors introduced during the filtering of the de-patterned interleaved pilot symbol.

According to a second aspect of the invention there is provided a receiver for receiving a signal that was transmitted using an orthogonal frequency division multiple access (OFDMA) modulation scheme in which pilot symbols are transmitted during OFDM symbol periods of the transmitted signal, the receiver comprising: an interleaver configured to interleave a de-patterned pilot symbol that was transmitted in an OFDM symbol period of the transmitted signal with a de-patterned pilot symbol that was transmitted in a previous OFDM symbol period of the transmitted signal to generate an interleaved de-patterned pilot symbol; a filter configured to filter the interleaved de-patterned pilot symbol to remove a signal component of the interleaved de-patterned pilot symbol to leave a noise component of the interleaved de-patterned pilot symbol; and a processor configured to process the noise component generated by the filtering to generate an estimate of the noise power in the interleaved de-patterned pilot symbol.

The receiver may further comprise a phase rotator configured to perform a phase rotation of the de-patterned pilot symbols of the received signal in the frequency domain.

The receiver may further comprise a buffer for storing the de-patterned pilot symbol that was transmitted in the previous OFDM symbol period.

The receiver may further comprising a scaling unit configured to scale the noise power estimate to compensate for errors introduced during the filtering of the interleaved de-patterned pilot symbol by the filter.

BRIEF DESCRIPTION OF THE DRAWINGS

Embodiments of the invention will now be described, strictly by way of example only, with reference to the accompanying drawings, of which:

FIG. 1 is a schematic representation of a structure of a frame transmitted using an orthogonal frequency division multiple access (OFDMA) modulation scheme;

FIG. 2 is a schematic representation of a structure of a subframe of the frame illustrated in FIG. 1;

DETAILED DESCRIPTION

Figure 3:
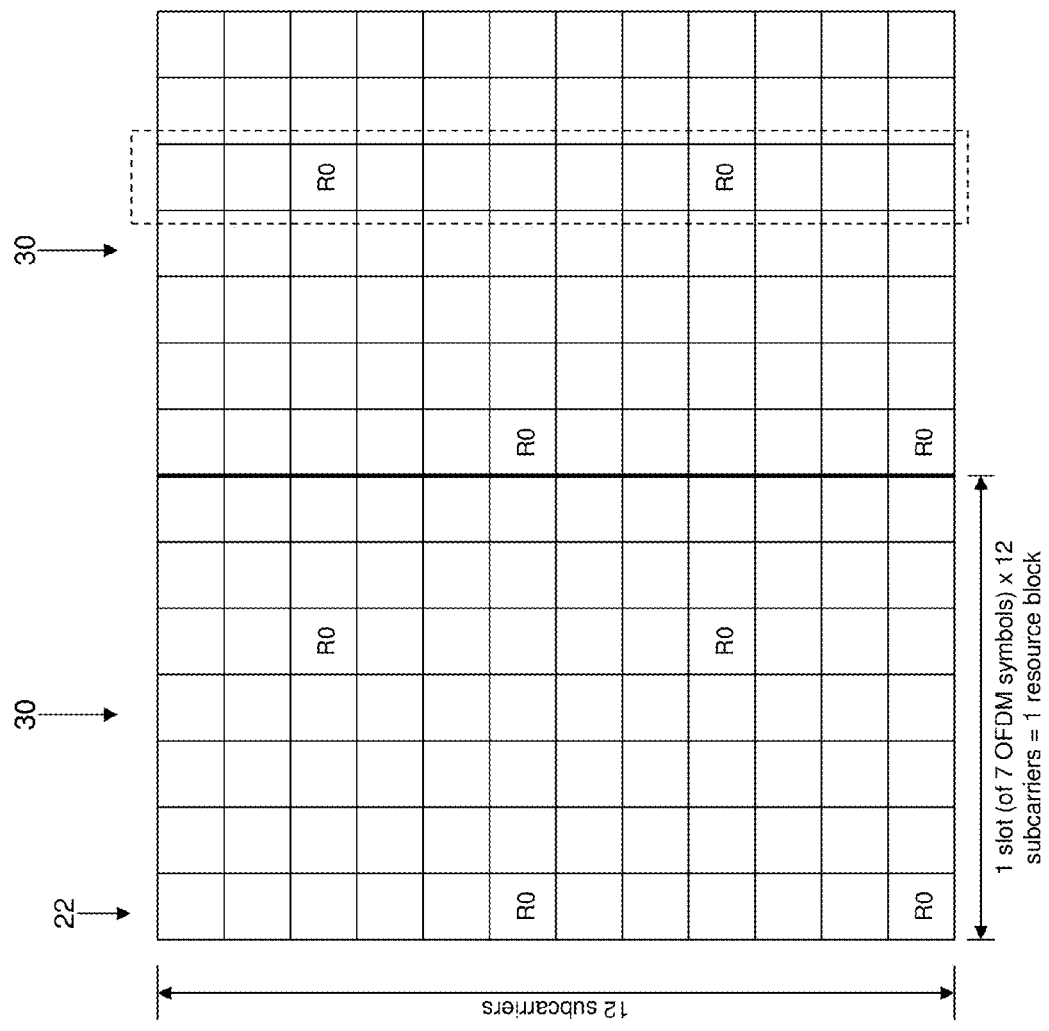
FIG. 3 is a schematic representation of two resource blocks of the frame illustrated in FIG. 1.

Referring first to FIG. 1, a frame of a signal transmitted using an orthogonal frequency division multiple access (OFDMA) modulation scheme, for example a frame transmitted under the LTE or LTE-A standards discussed above, is shown generally at 10. The frame 10 has a duration of 10 milliseconds, and is made up of ten subframes 20, each having a duration of one millisecond. Each subframe 20 is in turn divided into two slots 12, each having a duration of 0.5 milliseconds. As can be seen from the schematic illustration of FIG. 2, each slot 12 contains 7 OFDM symbols 22, such that each subframe 20 contains 14 OFDM symbols 22.

Each OFDM symbol 22 is divided amongst a plurality of mutually orthogonal subcarriers, the number of available subcarriers being dependent upon the transmission bandwidth of the system transmitting the signal to be transmitted. A resource block 30, which is the smallest possible unit for data allocation in an OFDMA system, consists of 12 subcarriers that are contiguous in frequency for a duration of one slot. This is illustrated schematically in FIG. 3, which shows two resource blocks 30, each containing 12 frequency-contiguous subcarriers (shown extending vertically) for one slot of 7 OFDM symbols 22 (shown extending horizontally).

The grid illustrated in FIG. 3 is known as a resource grid, with each square of the grid representing one OFDM subcarrier for one symbol period. The squares of the resource grid are referred to as resource elements (REs).

In an LTE receiver (e.g. a receiver of a mobile telephone) there is typically a channel estimation block or sub-system that is configured to estimate channel state information representing the condition of the propagation channel between the receiver and a transmitter that transmits signals to the receiver. The transmitter transmits a known pilot signal to the receiver, and the channel estimation block decodes the received signal to recover the pilot signal, which will have been affected by the propagation channel through which it travelled from the transmitter to the receiver. By comparing the decoded version of the pilot signal to the original known pilot signal, the channel estimation block can determine the effect of the channel on the pilot signal, and from this can generate an estimate of the channel impulse response of the channel, representing the effect of the channel on a transmitted signal.

The pilot signal is transmitted by modulating pilot or reference symbols of the pilot signal onto selected ones of the plurality of mutually-orthogonal subcarriers, using an inverse fast Fourier transform (IFFT) (which is also used for modulating data symbols onto the plurality of subcarriers) at the transmitter.

As can be seen from FIG. 3, pilot symbols R0 are embedded in the resource blocks 30 that are transmitted by a transmitter of the system transmitting the signal. The pilot symbols R0 are transmitted according to a preset pattern that repeats for each resource block 30. In the example illustrated in FIG. 3, the pilot symbols R0 are transmitted in the first and fifth symbol periods of the resource blocks 30. Additionally, consecutive ones of the pilot symbols R0 are transmitted at different frequencies, as they are transmitted on different ones of the plurality of OFDM subcarriers. In the example illustrated in FIG. 3, pilot symbols R0 are transmitted on the first and sixth OFDM carriers in the first symbol period, and in the fourth and tenth OFDM carriers in the fifth symbol period.

Assuming that a pilot symbol $p_k(i)$ is transmitted on the kth subcarrier of the ith OFDM symbol, the version $y_k(i)$ of the pilot symbol received at a receiver (following a fast Fourier transform (FFT) operation to reverse the inverse fast Fourier transformation undergone by the pilot symbol at the transmitter) may be written as $$y_k(i) = H_k(i) \cdot p_k(i) + n_k(i), \qquad (1)$$

where $H_k(i)$ represents the channel state information at the kth subcarrier of the ith OFDM symbol, $p_k(i)$ is the pilot symbol and $n_k(i)$ represents additive white Gaussian noise (AWGN) with a variance $\sigma^2 = E\{|n_k(i)^2|\}$ ($E\{\ \}$ is the expectation operator).

After the FFT operation, the pilot symbols R0 are de-patterned. This symbol de-patterning is to extract the received pilot symbols from positions to which the pilot symbols are allocated in the time-frequency grid (or resource grid), as shown in FIG. 3, and to divide the received pilot symbols by the locally generated pilot symbols. The de-patterned pilot is equivalently an estimate of the channel state information $\hat{H}_k(i)$, representing the channel actually experienced by the pilot symbol $p_k(i)$, which can be expressed as $$\hat{H}_k(i) = \frac{y_k(i)}{p_k(i)}$$

From this it follows that $$\hat{H}_k(i) = \frac{H_k(i) \cdot p_k(i) + n_k(i)}{p_k(i)} = H_k(i) + \frac{n_k(i)}{p_k(i)}$$

The above equation can be rewritten as $$\hat{H}_k(i) = H_k(i) + \tilde{n}_k(i), \qquad (2)$$

where $$\tilde{n}_k(i) = \frac{n_k(i)}{p_k(i)}.$$

Assuming $p_k(i)$ has a unit power, $\tilde{n}_k(i)$ is still an additive white Gaussian noise with the same power as $n_k(i)$ has.

The channel estimate $\hat{H}_k(i)$ for the whole of the transmitted signal can be derived by interpolating the channel estimate $\hat{H}_k(i)$ for the pilot symbols across the whole of the frequency band of the transmitted signal.

The channel estimate $\check{H}_k(i)$ at the pilot locations may be regarded as the channel estimate of the channel experienced by the de-patterned pilot symbols after removing the noise. Thus, the noise power in a received signal can be estimated by subtracting the channel estimate $\check{H}_k(i)$ at the pilot locations from the channel estimate $\hat{H}_k(i)$ for the pilot symbols. However, it will be appreciated that the accuracy of the noise estimate is dependent upon the accuracy of the channel estimate using this method. Additionally, channel estimates may not be available when noise power estimates are required in some situations.

It is possible to perform noise power estimation in a received signal independently of channel estimation, as will be explained below.

It can be assumed that the channel impulse response does not change significantly between pilot symbols, i.e. $H_k(i-1)$ ≈$H_k(i)$, where l is the time between two pilot symbols. This assumption is valid when l is smaller than the coherence time of the channel.

Based on this assumption, the de-patterned pilot symbols R0 of a previous received OFDM symbol can be interleaved with those of a current received OFDM symbol. This is shown schematically in FIG. 4, in which it can be seen that the de-patterned pilot symbols R0 from the first OFDM symbol period have effectively been moved to the fifth symbol period, to interleave them with the de-patterned pilot symbols R0 present in the fifth symbol period.

Interleaving the de-patterned pilot symbols in this way reduces the number of images of the de-patterned pilot symbol that are present in the frequency spectrum of the de-patterned pilot symbols for the symbol period in which they appear, effectively increasing the bandwidth of noise in the spectrum of the de-patterned pilot symbols for that symbol period, making it easier to filter the noise from the wanted signal, and thus to estimate noise power in the received signal, as will now be explained.

Figure 5:
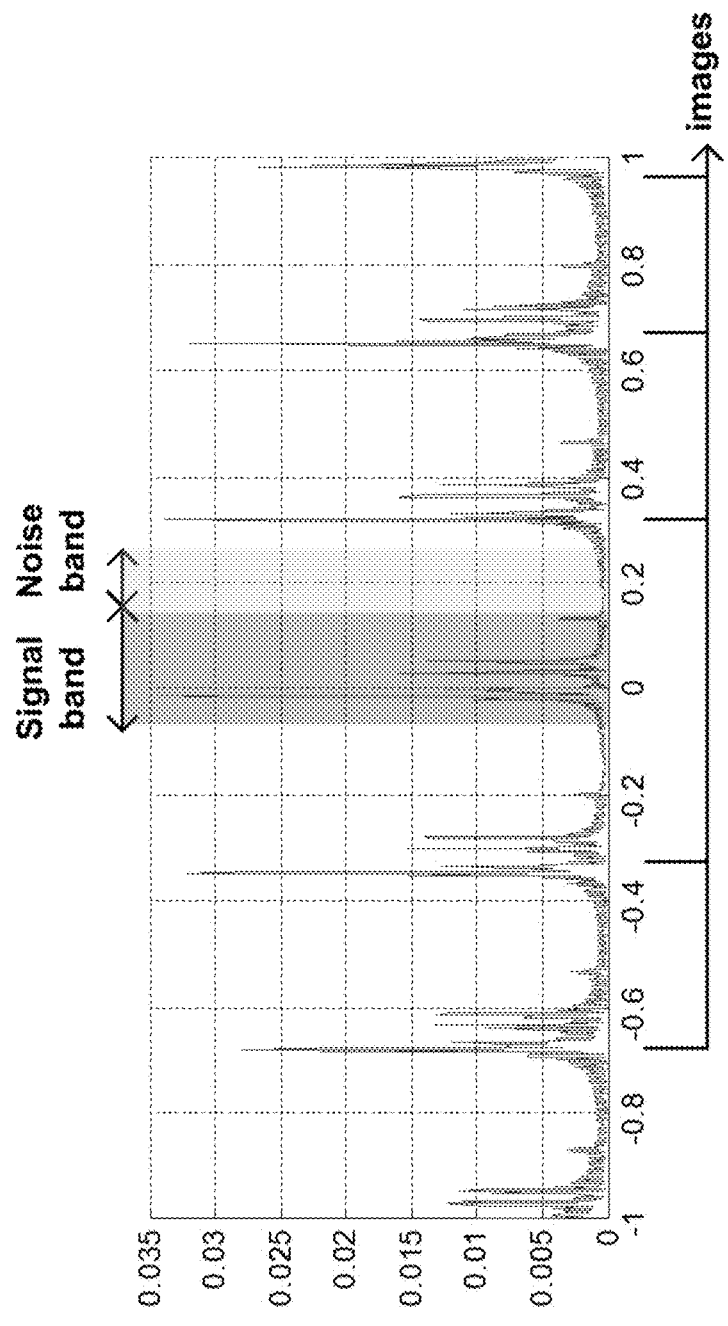
FIG. 5 is a representation of a normalised frequency spectrum of de-patterned pilot symbols across the whole signal bandwidth of a transmitted signal that includes resource blocks as shown in FIG. 3.

FIG. 5 is a representation of a normalised frequency spectrum of the de-patterned pilot symbols R0 in the fifth OFDM symbol period (shown in dashed outline) in the second resource block shown in FIG. 3. As can be seen, the frequency spectrum of the pilot symbols includes a main signal band centred around 0 and a plurality of image signal bands (e.g. centred around approximately 0.3 and approximately 0.7 respectively). There is one main signal band and five images because the subcarrier spacing between the two adjacent pilots is six (i.e. the second pilot symbol is modulated onto the sixth subcarrier from the first pilot symbol), and the subcarriers between the two adjacent pilot symbols are filled with zeros. Between the main signal band and the first image signal band is a noise band. In order to estimate the noise power in the received signal, a band pass filter must be applied to filter out the signal band, leaving only the noise band. However, as will be appreciated by those skilled in the art, the signal band and the noise band are very close together in frequency, meaning that a filter with a very sharp roll off is required to filter out the signal and leave only the noise. Such filters are complex to implement, and thus costly.

Figure 4:
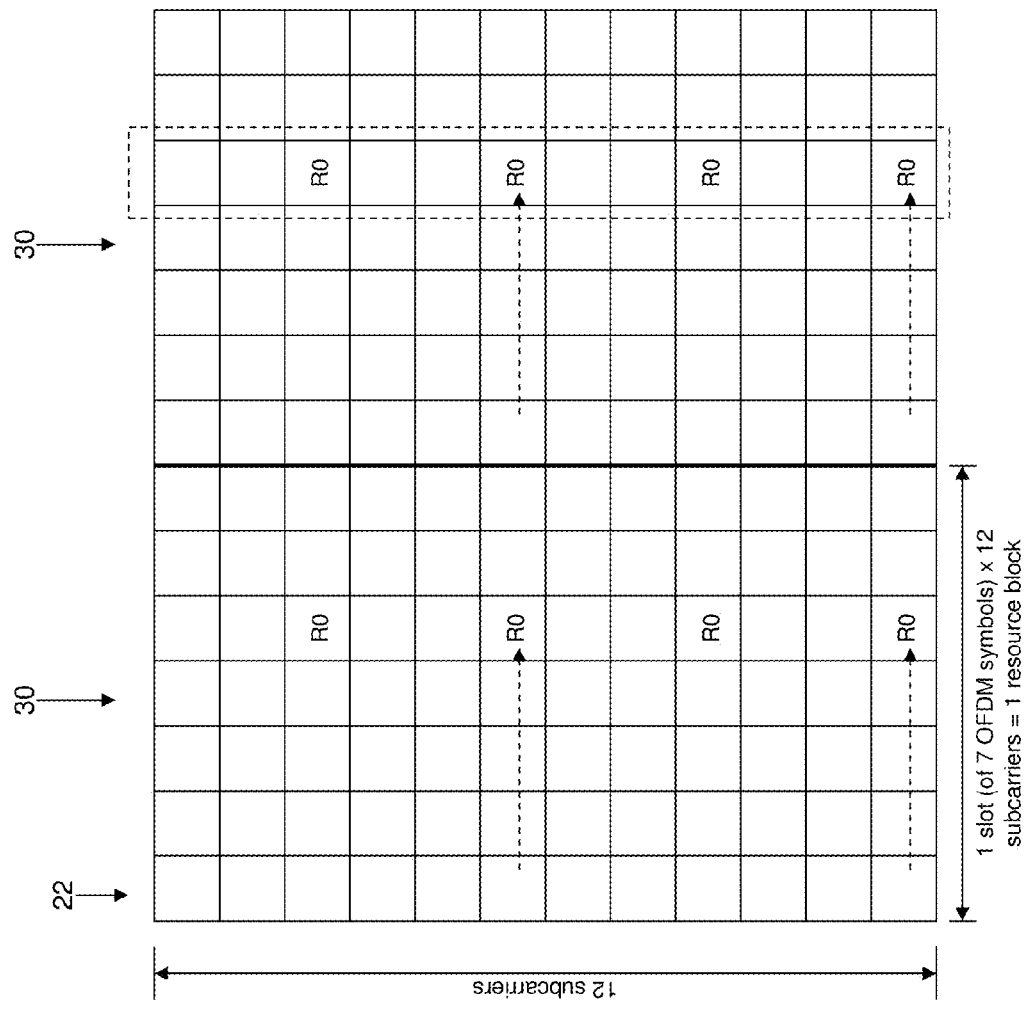
FIG. 4 is a schematic representation illustrating interleaving of pilot symbols in an OFDM symbol in a signal transmitted using an OFDMA modulation scheme.
Figure 6:
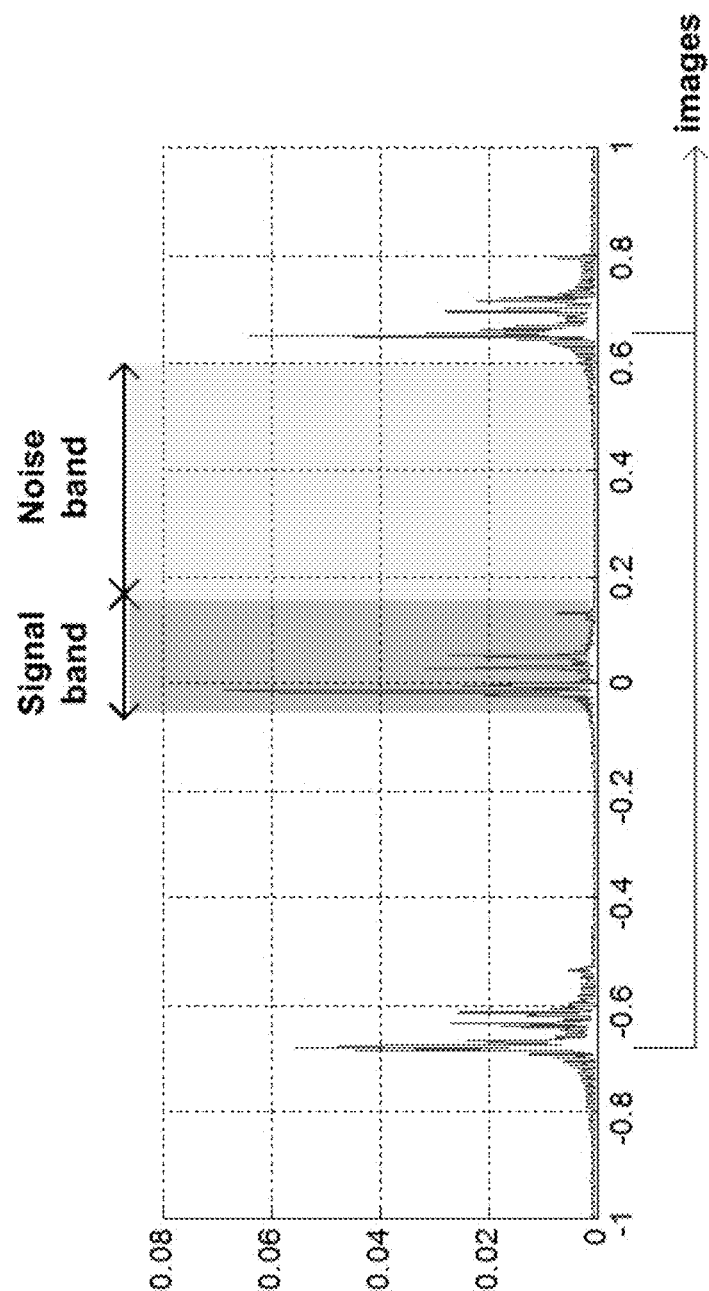
FIG. 6 is a is a representation of a normalised frequency spectrum of de-patterned pilot symbols across the whole signal bandwidth of a transmitted signal that includes resource blocks as shown in FIG. 4.

In contrast, FIG. 6 is a representation of a normalised frequency spectrum of the de-patterned pilot symbols R0 in the fifth OFDM symbol period (shown in dashed outline) in the second resource block shown in FIG. 4. As is explained above, the fifth OFDM symbol in the second resource block shown in FIG. 4 includes interleaved pilot symbols from a previous OFDM symbol. The effect of this interleaving of the pilot symbols is to reduce the number of signal band images in the frequency spectrum of the pilot symbols R0, which increases the bandwidth of the noise band between the main signal band and its first image signal band. The reason for this is that by interleaving de-patterned pilots, the subcarrier spacing between adjacent pilot symbols is reduced from six to three, meaning that, in accordance with established signal processing theory, the total number of main signal bands and images will be reduced to three.

As will be appreciated by those skilled in the art, designing a filter to filter out the signal band from the increased noise band is significantly less challenging, and the resulting filter will be simpler in comparison to a filter for filtering out the main signal band shown in FIG. 5, and therefore less costly.

Figure 7:
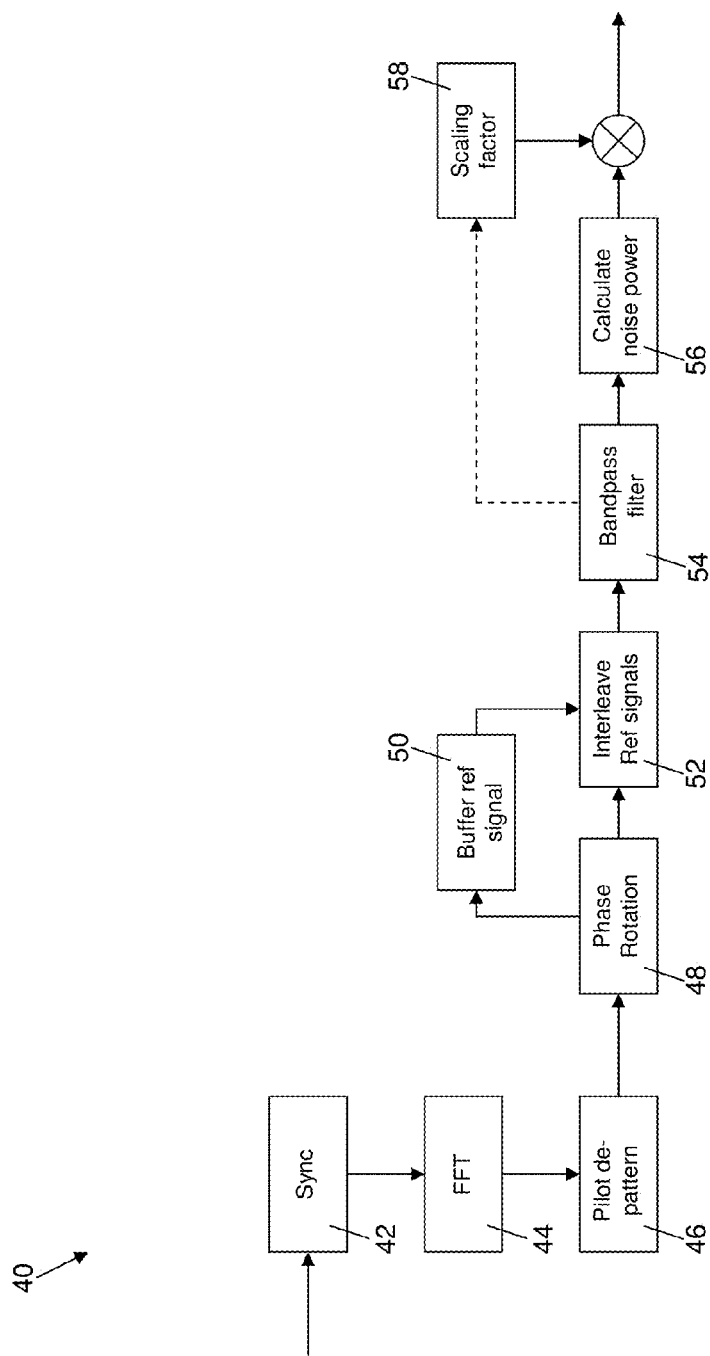
FIG. 7 is a schematic representation of an architecture for estimating the noise power in a signal transmitted using an OFDMA modulation scheme.

FIG. 7 is a schematic representation of an exemplary architecture for effecting the interleaving of reference signal discussed above in a receiver. It will be appreciated that the schematic representation of FIG. 7 presents the architecture as a series of functional blocks, but that the functional blocks do not necessarily represent physical components of a "real world" implementation of the architecture, but are instead intended to represent processing operations undergone by a received signal.

The architecture 40 illustrated in FIG. 7 includes a synchronisation block 42, which is configured to perform timing synchronisation of a received signal. The time synchronised signal so generated is output by the synchronisation block 42 to an FFT block 44, which is configured to perform an FFT on the time synchronised received signal, to convert the received signal to the frequency domain, reversing the effect of the inverse FFT applied to the pilot symbols at the transmitter side.

The FFT block 44 outputs a frequency domain signal to a pilot symbol de-patterning block 46, which is operative to perform pilot symbol de-patterning. The de-patterned pilot symbols are output by the de-patterning block to a phase rotation block 48.

The start point of a FFT window used by the FFT block 44 is intended to coincide with the start of the received signal. However, the timing synchronisation performed by the synchronisation block 44 may not be perfectly accurate, and so the start point of the FFT window used by the FFT block 44 may not coincide exactly with the start of the received signal. Thus, a time offset may be introduced in the received signal, which corresponds to a phase shift when the received signal is converted into the frequency domain by the FFT block 44.

The phase rotation block 48 is intended to compensate for this introduced time offset/phase shift. The phase rotation block 48 is configured to receive from the pilot de-patterning block 46 a vector $\tilde{H}(i)$ of de-patterned pilot symbols, where $\tilde{H}(i)=[\tilde{H}_0(i) \ldots \tilde{H}_{K-1}(i)]^T$, where K is the number of pilot symbols in the relevant OFDM symbol period.

The phase rotation block 48 is configured to estimate the linear phase caused by modulation delay, using the equation $$\hat{\theta} = \frac{1}{d_p} \angle \left( \sum_{k=0}^{K-2} \hat{H}_k(i) \cdot \hat{H}_{k+1}^*(i) \right),$$

where $d_p$ is pilot spacing in frequency; $\angle$ denotes the angle of a complex variable; $\hat{H}_k(i)$ is the k-th de-patterned pilot at symbol i; and K is the number of pilots in the observation window.

After detecting the linear phase, the phase rotation can be expressed as $$\tilde{H}_k(i) = \hat{H}_k(i) e^{-j\hat{\theta}_j k d_p}, k=0,1,\ldots K-1$$

Thus, the phase rotation block 48 applies a phase rotation to the de-patterned pilot symbols in the received signal to re-centre the main signal band in the normalised spectrum of the pilot symbols (as illustrated in FIG. 6) around 0. As will be appreciated, the time offset introduced by the synchronisation block 42 is not necessarily constant, and thus the dynamic compensation for this provided by the phase rotation block 48 helps to ensure that the subsequent filtering of the received signal is correctly applied, which improves the accuracy of the noise power estimation.

The phase rotation block 48 outputs a phase rotated version of the vector $\tilde{H}(i)$ to a buffer 50, which is configured to buffer or store the pilot symbols R0 of a received OFDM symbol, so that they can be interleaved with the pilot symbols R0 of a subsequent received OFDM symbol.

Outputs of the phase rotation block 48 and the buffer 50 are connected to inputs of a pilot symbol interleaving block 52, which is configured to interleave buffered pilot symbols R0 of a previous OFDM symbol, output by the buffer 50, with pilot symbols R0 of a current OFDM symbol, as output by the phase rotation block 48.

An output of the pilot symbol interleaving block 52 is input to a band pass filter 54, which is configured to filter out the signal band of the input signal, leaving only the noise band. In some embodiments the band pass filter 54 is configured to up-sample the signal received at its input. For example, the band pass filter 54 may be a 3× up-sampling band pass filter, meaning if K is the number of pilot symbols in the relevant OFDM symbol period, the band pass filer 54 will output 3K samples.

The signal output by the band pass filter 54 is input to a noise power estimation block 56, which is configured to calculate an estimate of the noise power in the received signal based on the noise band output by the band pass filter 54. The noise power estimation block 56 is configured to perform a calculation to estimate the noise power $\sigma^2$ in the received signal:

$$\sigma^2 = \frac{1}{M} \sum_{m=0}^{M-1} |w_m(i)|^2,$$

where $w_m(i)$ is the output of the band pass filter 54 for samples m=0, 1, ..., M−1.

The noise power estimation block 56 outputs the noise power estimate $\sigma^2$ to a scaling block 58, which applies a scaling factor $\alpha$ to the noise power estimate $\sigma^2$. The scaling factor $\alpha$ is dependent on the bandwidth and sampling frequency of the band pass filter 54 by the relationship $$\alpha = \frac{f_s}{f_{high} - f_{low}},$$

where $f_s$ is the sampling frequency of the band bass filter 48, $f_{high}$ is the upper cut-off frequency of the band pass filter 54 and $f_{low}$ is the lower cut-off frequency of the band pass filter 54.

What is claimed is:

1. A method for estimating noise power in a received signal that was transmitted using an orthogonal frequency division multiple access (OFDMA) modulation scheme in which pilot symbols are transmitted during OFDM symbol periods of the transmitted signal, the method comprising:

interleaving a de-patterned pilot symbol that was transmitted in an OFDM symbol period of the transmitted signal with a de-patterned pilot symbol that was transmitted in a previous OFDM symbol period of the transmitted signal to generate an interleaved pilot symbol;

filtering the interleaved de-patterned pilot symbol to remove a signal component of the interleaved de-patterned pilot symbol to leave a noise component of the interleaved de-patterned pilot symbol;

processing the noise component generated by the filtering to generate an estimate of the noise power in the interleaved de-patterned pilot symbol;

performing a phase rotation of the de-patterned pilot symbols of the received signal in the frequency domain; and scaling the noise power estimate to compensate for errors introduced during the filtering of the de-patterned interleaved pilot symbol.

2. A method according to claim 1 wherein the de-patterned pilot symbol that was transmitted in the previous OFDM symbol period is stored in a buffer.

3. A receiver for receiving a signal that was transmitted using an orthogonal frequency division multiple access (OFDMA) modulation scheme in which pilot symbols are transmitted during OFDM symbol periods of the transmitted signal, the receiver comprising:

an interleaver configured to interleave a de-patterned pilot symbol that was transmitted in an OFDM symbol period of the transmitted signal with a de-patterned pilot symbol that was transmitted in a previous OFDM symbol period of the transmitted signal to generate an interleaved de-patterned pilot symbol;

a filter configured to filter the interleaved de-patterned pilot symbol to remove a signal component of the interleaved de-patterned pilot symbol to leave a noise component of the interleaved de-patterned pilot symbol;

a processor configured to process the noise component generated by the filtering to generate an estimate of the noise power in the interleaved de-patterned pilot symbol a phase rotator configured to perform a phase rotation of the de-patterned pilot symbols of the received signal in the frequency domain;

a scaling unit configured to scale the noise power estimate to compensate for errors introduced during the filtering of the interleaved de-patterned pilot symbol by the filter; and a buffer for storing the de-patterned pilot symbol that was transmitted in the previous OFDM symbol period.

\* \* \* \* \*